UNITED STATES PATENT OFFICE.

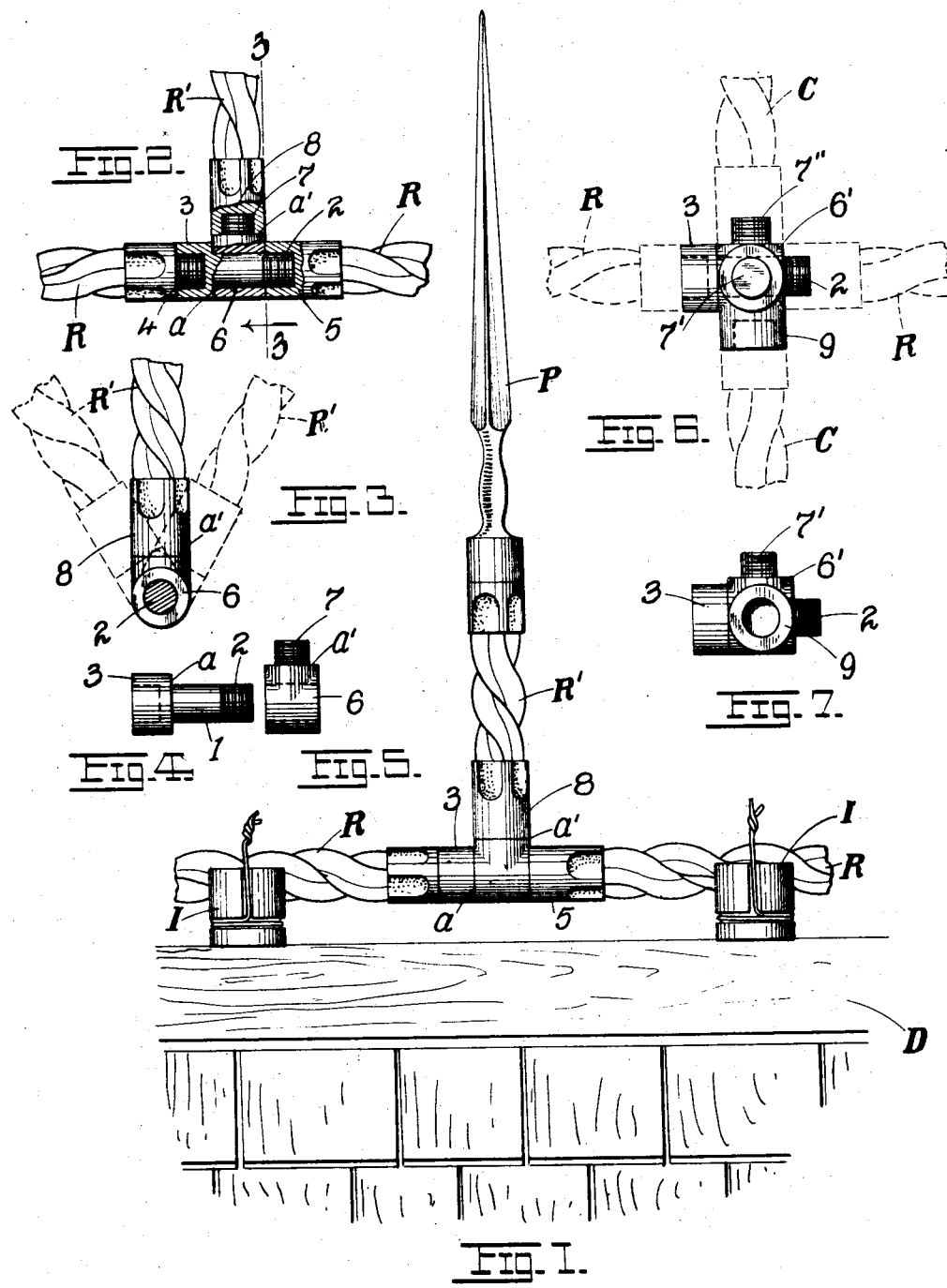

GEORGE A. MILLER, OF ST. LOUIS, MISSOURI, ASSIGNOR TO ST. LOUIS LIGHTNING ROD CO., OF ST. LOUIS, MISSOURI, A CORPORATION OF MISSOURI.

TWO-MALE T.

No. 873,154.  Specification of Letters Patent.  Patented Dec. 10, 1907.

Application filed February 4, 1907. Serial No. 355,625.

*To all whom it may concern:*

Be it known that I, GEORGE A. MILLER, citizen of the United States, residing at St. Louis, State of Missouri, have invented certain new and useful Improvements in Two-Male T's, of which the following is a full, clear, and exact description, reference being had to the accompanying drawings, forming a part hereof.

My invention has relation to improvements in two-male tees or couplings for lightning rods; and it consists in the novel construction of coupling more fully set forth in the specification and pointed out in the claims.

In the drawings, Figure 1 is a side elevation of a section of a roof of a house showing the application of my invention to a lightning rod thereon; Fig. 2 is a sectional side elevation of the invention; Fig. 3 is a cross section on line 3—3 of Fig. 2, showing in dotted outline the possible positions of the point-rod; Fig. 4 is a side view of the male section of the coupling; Fig. 5 is a side view of the female portion; Fig. 6 is a top plan of a modified form of tee or coupling; and Fig. 7 is a side view of Fig. 6.

The present coupling or tee has special application in the coupling of lightning rod sections, and has for its object to permit the coupling of two sections running in a continuous or in the same direction, and at the same time permit the coupling to said tee of a third section running at right angles to the first named sections, the direction of such third section being capable of accurate adjustment according to the specific purpose it is to subserve.

The present tee is specially applicable in connection with the point-rod of a lightning rod system, where it is desirable to give the rod a vertical disposition to enable it to conduct off to the best advantage the electric fluid.

The advantages of the present tee will be better apparent from a detailed description of the invention which is as follows:

Referring to the drawings, and more particularly to Figs. 1 to 5 inclusive, R, R, represent two contiguous lightning rod sections (generally ten-foot lengths) to be coupled together, the coupling serving in this instance to carry the point-rod R', that is the rod or section to which the lightning rod point P is secured. The coupling in the present instance is composed of a male and a female section, the male comprising a central cylindrical stem 1 terminating at one end in a screw-threaded portion 2, and at the opposite end in an interiorly threaded socket 3, the socket 3 receiving the screw-threaded terminal stem 4 of the adjacent rod R, and the threaded end 2 entering the terminal socket 5 of the contiguous rod R, (Fig. 2). The female section comprises an open ended socket or ring 6 which is adapted to pass over and be freely rotatable about the stem 1, being limited in one direction by the annular shoulder $a$ formed between the stem 1 and base of the socket 3. The peripheral wall of the ring 6 is provided with a screw-threaded nipple 7 to which is screwed the point-rod R' (Fig. 1), the nipple 7 being received by the interiorly screw-threaded socket 8 at the base of the rod, the end of the socket resting on the shoulder $a'$ formed around the base of the said nipple 7. The rods may be secured to the roof or any portion of the house  ther dwelling D by means of insulators  any approved construction.

A prevailing practice has been to cast the two-male tee in one piece. Where this is done there is no assurance that the nipple 7 will point vertically upward after the rods R, R, on opposite sides of the tee are screwed or coupled thereto. Should it happen for example that when one rod R to which the tee had been secured was subsequently screwed to the next contiguous parallel rod, and when the parts were driven firmly home and tightened, the nipple 7 were to assume an inclined position so that the point rod coupled thereto were to incline as shown by the left hand dotted position thereof in Fig. 3, it would be a difficult matter to straighten the point-rod to a vertical position, and could only be accomplished by subjecting the conductors, R R, on each side to a considerable strain and undue twist. Again should the initial position of the point-rod assume the right-hand dotted position in Fig. 3, then it could be righted by turning the tee to the left, or unscrewing the same to that extent and the tight connection between the contiguous rods would be destroyed, and the looseness could only be overcome by swaging the loosely fitting edges of the tee and rod together. With my present improvement however, after the ends of two contiguous rods R, R are firmly screwed to the male section of the coupling, it matters not what direction the axis of the nipple 7 may point or how inclined, because the ring 6 being freely rotatable about the stem 1 can, by the slightest loosening or unscrewing of one of the rods R on the male section, (so as to release its grip on the ring 6) be turned to give the axis of the nipple 7 a vertical direction, after which by again tightening the slightly loosened rod, the point-rod can be screwed to the now properly positioned nipple and the operation is completed.

In Figs. 6 and 7 I show a modified form of female-section in which the ring 6' in addition to the nipple 7' is provided at ninety degrees removed from such nipple, with an additional nipple 7" and a socket 9 whereby, in addition to the rods R, R, and point rod R', a second pair of rods or conductors C, C, leading to any convenient point, may be attached. In fact the ring of the female or rotatable section of the coupling may be provided with any convenient number of nipples and sockets according to the number of rods or conductors to be used in conducting the electric fluid.

Having described my invention, what I claim is:

In combination with two contiguous lightning-rod sections, a two-male tee comprising a male section composed of a cylindrical stem terminating at one end in a screw-threaded portion coupled to the adjacent end of one of the rods, and in an enlarged interiorly screw-threaded socket at the opposite end coupled to the adjacent end of the opposite rod, an annular shoulder formed between the stem and socket, and a female section comprising a ring freely rotatable about the stem and bearing against the shoulder, and having a peripheral screw-threaded nipple adapted to be coupled to a third rod, substantially as set forth.

In testimony whereof I affix my signature, in presence of two witnesses.

GEORGE A. MILLER.

Witnesses:
EMIL STAREK,
MARY D. WHITCOMB.